United States Patent

Marroux

[11] Patent Number: 5,610,568
[45] Date of Patent: Mar. 11, 1997

[54] CURVED OR STRAIGHT MAGNETIC BAR MADE UP OF SEPARATE MAGNETS

[75] Inventor: Oliver Marroux, Paris, France

[73] Assignee: Societe Nationale Industrielle et Aerospatiale, France

[21] Appl. No.: 280,500

[22] Filed: Jul. 26, 1994

[30] Foreign Application Priority Data

Sep. 16, 1993 [FR] France .................................. 93 11047

[51] Int. Cl.⁶ ...................................................... H01F 7/02
[52] U.S. Cl. ............................................ 335/306; 335/302
[58] Field of Search ........................ 335/301–6; 310/156, 310/750; 464/29, 41

[56] References Cited

U.S. PATENT DOCUMENTS

| | | |
|---|---|---|
| 3,937,533 | 2/1976 | Veillette . |
| 3,955,858 | 5/1976 | Poubeau . |
| 4,000,929 | 1/1977 | Studer . |
| 4,043,614 | 8/1977 | Lyman . |
| 4,077,678 | 3/1978 | Studer et al. . |
| 4,211,452 | 7/1980 | Poubeau . |
| 4,329,673 | 5/1982 | Uchikune et al. ...................... 335/288 |
| 4,393,363 | 7/1983 | Iwasaki .................................. 335/302 |
| 4,470,644 | 9/1984 | Weisser . |
| 4,638,281 | 1/1987 | Baermann .............................. 335/303 |
| 5,098,203 | 3/1992 | Henderson . |
| 5,204,572 | 4/1993 | Ferreira ................................. 335/306 |
| 5,502,426 | 3/1996 | Tsai ....................................... 335/304 |

FOREIGN PATENT DOCUMENTS

| | | |
|---|---|---|
| 284487 | 3/1988 | European Pat. Off. . |
| 3047606 | 9/1981 | Germany . |
| 3642381 | 6/1988 | Germany . |
| 642353 | 3/1949 | United Kingdom . |

*Primary Examiner*—Lincoln Donovan
*Attorney, Agent, or Firm*—Remy J. VanOphem; Thomas A. Meehan; John VanOphem

[57] ABSTRACT

A magnetic bar includes a magnetized core extending along a median line between two parallel polepieces extending along the magnetized core transversely to its permanent magnetization. The magnetized core embodies, substantially along the median line, a discontinuous succession of identical separate magnets. The magnetic bar can be used in the manufacture of magnetic bearings and thrust bearings.

25 Claims, 8 Drawing Sheets

CURVED OR STRAIGHT MAGNETIC BAR MADE UP OF SEPARATE MAGNETS

BACKGROUND OF THE INVENTION

1. Field of the Invention

The invention concerns a permanently magnetized bar including magnets disposed between polepieces.

2. Description of the Prior Art

Many magnetic devices, such as magnetic bearings in particular, use permanent magnets inside permanently magnetized bars which are either straight or curved to form rings.

The permanently magnetized rings are used in the devices described in U.S. Pat. Nos. 3,937,533, 3,955,858, 4,000,929, 4,043,614, 4,077,678, 4,211,452, 4,470,644 and European Patent 0,284,487.

The rings include permanently magnetized cores between two ferromagnetic polepieces. If the direction of permanent magnetization is axial, the two polepieces are on opposite axial sides of the core and are generally flattened transversely to the axis: the two polepieces are in practice identical and have mean diameters substantially equal to the mean diameter of the core. If the direction of permanent magnetization is radial, the two polepieces are concentric cylinder portions on opposite radial sides of the core.

European Patent No. 0,284,487 also describes a straight magnetic bearing using straight permanently magnetized bars. In this case both the permanently magnetized core and the polepieces on either side of it are straight, the two polepieces being disposed transversely to the direction of permanent magnetization.

The cores are designed to generate as constant as possible a magnetic flux along elongate projections of the bar designed to border the airgaps, in practice edges of the polepieces, whether the bar is curved or straight. This is why the core is in practice made entirely from a permanently magnetized material such as Samarium-Cobalt.

There are problems in making continuous bars of permanently magnetized material as only small straight bars or rings can be made in one piece given the requirements for homogeneous magnetization and compacting during sintering. For larger sizes (typically diameters exceeding 70 mm) use is made of elements usually called "tiles" which are designed to fit together edge-to-edge with maximum precision to approximate a continuous magnetized core. Especially if the core to be made is curved (usually a ring) its fabrication is time-consuming and costly given the obligation to make the tiles with a very accurate geometry specific to the bar to be made and to give all the tiles the same magnetization characteristics. The tiles cannot be manufactured until the design of the ring is entirely finished.

An object of the invention is to overcome these drawbacks by means of a permanently magnetized bar having a permanently magnetized core between polepieces and with a structure that is easy to manufacture at lower cost than previously with short manufacturing times, with the magnetic flux along the polepieces, in practice along their edges forming elongate projections adapted to border the airgaps, guaranteed to be at least as homogeneous as in the past.

SUMMARY OF THE INVENTION

To this end the invention proposes a magnetic bar including a magnetized core extending along a median line between two parallel polepieces extending along the core magnetized transversely to its permanent magnetization, wherein the magnetized core embodies a discontinuous succession of identical separate magnets substantially lengthwise of the median line.

A bar structure of this kind has many advantages:

- it enables the use of simple shaped magnets, preferably cylindrical magnets (or parallelepiped shaped magnets), the manufacture of which is readily standardized,
- this facility for standardization is enhanced by the fact that the simple shaped magnets can be manufactured before their final destination is known (the given magnets can be used to fabricate straight bars or rings of any diameter); this minimizes the lead time between design and manufacture of a bar,
- it minimizes the loads applied to the magnets (which are fragile) through the use within the core of a holding structure fixed to the polepieces and containing the magnets in the manner of a cartridge belt or cylinder (as in "revolver cylinder"),
- this type of holding structure holds the magnets very well, possibly eliminating the need to use an adhesive,
- the absence of adhesive makes the magnets removable (it is sufficient to separate the holding structure from at least one of the polepieces),
- the final stiffness of a bearing incorporating the bar can be adjusted by altering the number of magnets in the core (in the case of a holding structure including housings, some housings can be left empty; conversely, additional housings can be formed so that magnets can be added),
- as the magnets can be very small, which leads to the use of a large number of magnets in a given bar, it is possible to tolerate disparities between the magnetic performance of the magnets: their large number and the distribution of the flux in the polepieces leads to statistical smoothing of performance, yielding an entirely acceptable consistency of the flux in the polepieces,
- the cartridge belt or cylinder structure of the core (with magnets inserted in housings of a holding structure) is simple and enables easy prediction and control of temperature-dependent deformation of the core,
- the invention makes the manufacture of large bars simple and inexpensive, especially the manufacture of large diameter magnetized rings,
- the invention provides a highly constant magnetic flux along the edges of the polepieces defining the airgaps, despite the use of discrete sources of flux.

According to preferred features of the invention, some of which may be combinable with others:

- each magnet has a constant cross section parallel to the polepieces,
- the gap between two consecutive magnets of the core is between one and four times the width of each magnet parallel to the median line,
- the width of each magnet parallel to the median line is between 50% and 200% of the height of the magnets transversely to the polepieces,
- the width of each magnet parallel to the median line is substantially equal to its dimension transversely to the median line and parallel to the polepieces,
- each magnet is cylindrical,
- the median line is a straight line,
- the median line is a circle: in this case the dimension of the magnets parallel to the median line defines an arc subtending an angle in the order of 1° to 15° and the separation of the magnets along the median line defines an arc subtending an angle between 0° and 36° (with 10 magnets), the separation of the magnets varies along the median line, the magnets are disposed axially, the magnets are disposed radially, the magnets are centered on the median line, at least some magnets are disposed on one side or the other of the median line, for example they alternate, the core further includes an elongate holding member fixed to the two polepieces and in which are formed housings in which the magnets fit without play, the elongate holding member is made from a nonmagnetic material, such as aluminum, titanium or a plastics material, the elongate holding member includes, facing the polepieces, grooves parallel to the median line in which fit without play locating ribs on the polepieces and extending parallel to the median line, the magnets extend across all of the distance between the polepiece projections, the locating ribs extend towards the median line over a distance between 7% and 15% of the height of the magnets transverse to the polepieces, the locating ribs have a dimension parallel to the polepieces and transverse to the median line less than that of the magnets, the core is fixed to the polepieces by screwing the polepieces to the elongate holding member, the polepieces include, laterally, longitudinal projections adapted to border airgaps, the polepieces include, opposite the magnets, longitudinal projections adapted to extend along the airgaps, the polepieces are made from a ferromagnetic material such as pure iron or iron alloy, for example iron-nickel, iron-silicon, or iron-cobalt alloy, and the elongate holding member is made from a nonmagnetic material.

Objects, features and advantages of the invention emerge from the following description given by way of non-limiting example with reference to the appended drawings.

DETAILED DESCRIPTION OF THE PREFERRED EMBODIMENT

Figure 1:
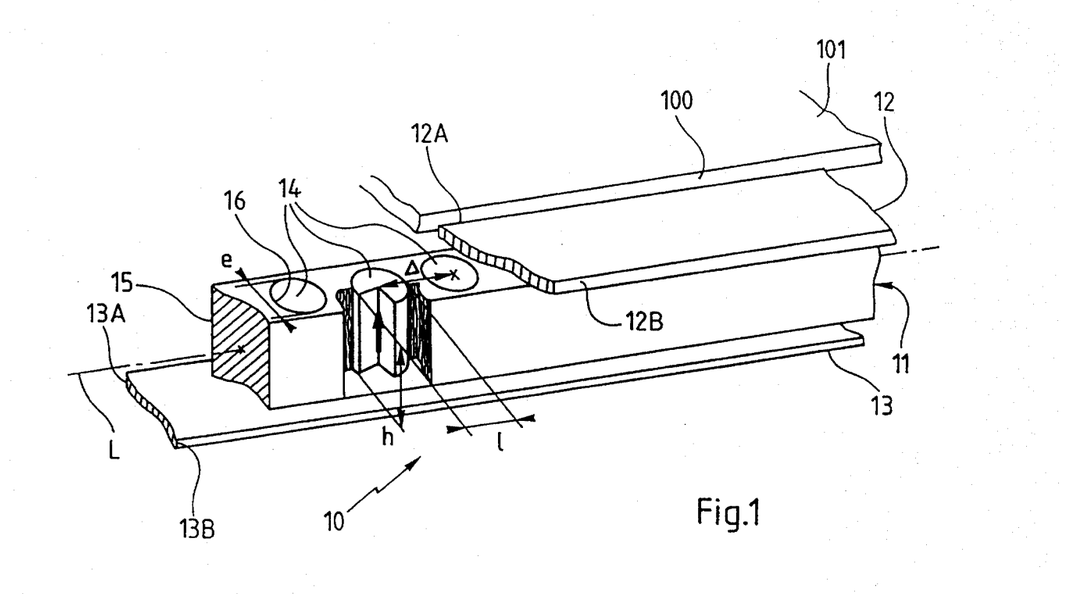
FIG. 1 is a partially cut away perspective view according to a straight magnetic bar according to the invention, appropriate correction is required.

FIG. 1 shows a magnetic bar 10 embodying a magnetized core 11 between two plane polepieces 12 and 13.

The magnetized core 11 extends lengthwise of a straight median line L and the polepieces 12 and 13 extend along the core, parallel to the median line, projecting to the sides in the direction transverse to the mediam line to form longitudinal projections 12A and 12B, and 13A and 13B adapted to extend along airgaps (one airgap 100 is shown by way of example) within a straight magnetic bearing, for example (the figure shows one part 101 of this bearing).

The magnetized core is permanently magnetized in a direction perpendicular to the median line and to the plates constituting the plane polepieces.

The magnetized core embodies, along the median line, a discontinuous succession of identical magnets 14. This succession of magnets is parallel to the median line L in this example, with the magnets all being centered on the median line L.

The magnets 14 preferably have a constant cross section parallel to the median line and to the polepieces.

The cross section of the magnets advantageously has a simple geometrical shape (square, rectangle, polygon, etc). This simple shape is preferably cylindrical, to make manufacture extremely simple.

Using the following notation:

l denotes the width of each magnet parallel to the median line, h denotes the height of each magnet parallel to the magnetization direction, e denotes the dimension of each magnet transverse to the median line and to the direction of magnetization, $\Delta$ denotes the distance between two consecutive magnets (to be more precise, between their centers), the following approximate relations advantageously apply:

l=e (which is the diameter in the case of cylindrical magnets), l is between 50% and 200% of h, $\Delta$ is between 1 and 4 times l, e is between 50% and 80% of the width of the polepieces.

The gap Δ is constant in this example but can instead vary along the median line, for example in a periodic manner.

In addition to the magnets 14, the magnetized core 11 advantageously includes an elongate holding member 15 in which are formed housings 16 in which the magnets fit without play (whence the benefit of a constant cross section).

In a simpler embodiment (not shown) the magnets are free of any holding member 15; however, the presence of the holding member has the advantage of holding the magnets in position and protecting them, and renders the bar assembly mechanically rigid while minimizing the loads imposed on the magnets.

From the magnetic point of view, the holding member 15 is made from a nonmagnetic material. This material can be titanium, aluminum, copper, a plastic material, etc.

Figure 2:
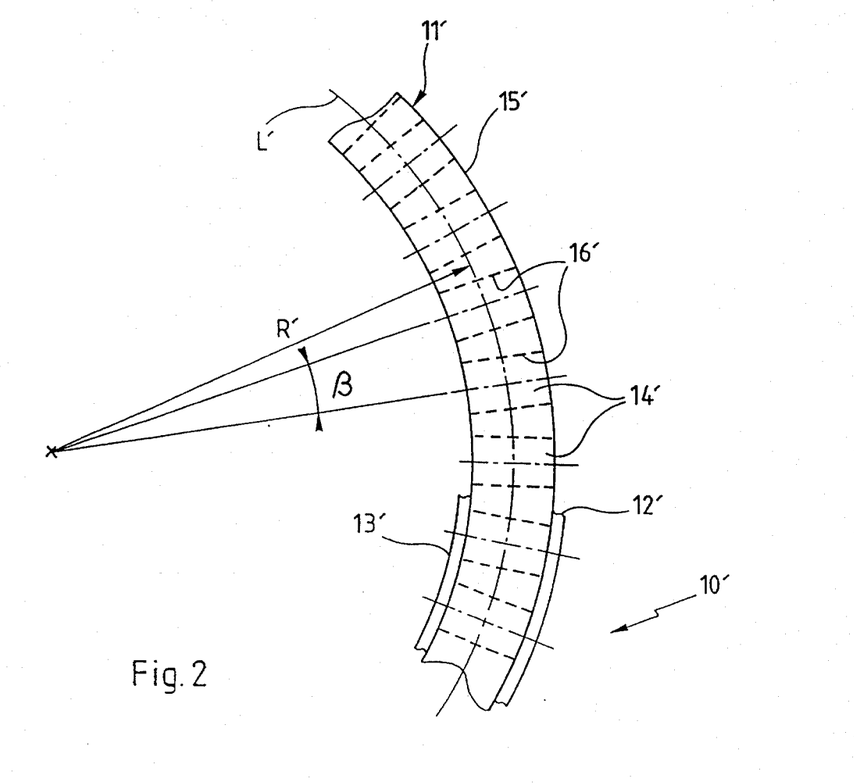
FIG. 2 is a partial top view of a circular magnetic bar which is magnetized radially.

FIG. 2 shows another bar 10' of the invention whose median line L' is circular, with radius R', rather than straight.

The same reference symbols are used as in FIG. 1, but "primed".

Note that the housings 16' and the magnets 14' are oriented radially, the polepieces 12' and 13' being concentric rings with different radii.

Figure 3:
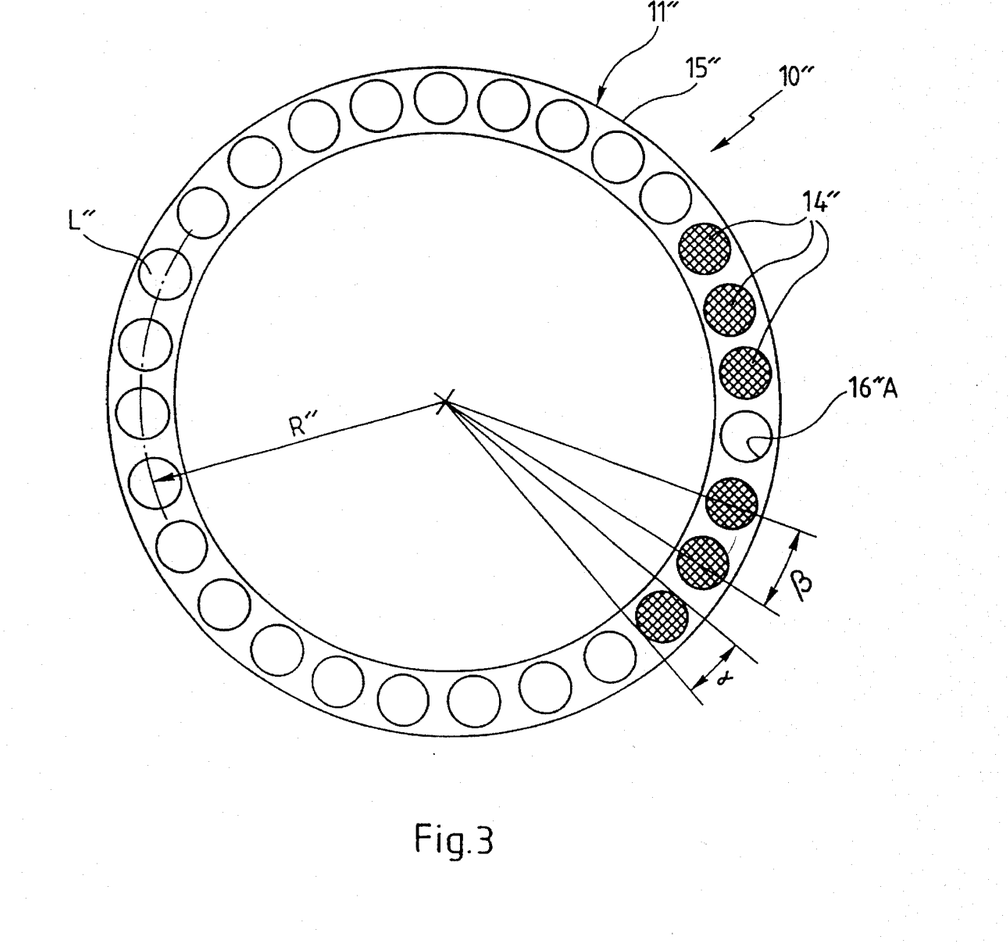
FIG. 3 is a top view of a circular magnetic bar magnetized axially without its polepieces.
Figure 4:
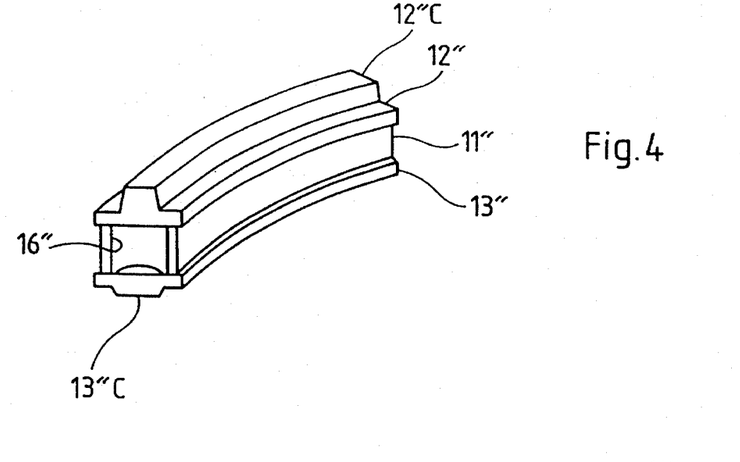
FIG. 4 is a partial perspective view of the bar from FIG. 3 with its polepieces.

FIGS. 3 and 4 show a bar 10" whose core 11' extends along a circular median line L" (the same reference numbers are used as in FIG. 1, but "double primed"). Unlike FIG. 2, the magnets 14" are oriented axially and the polepieces 12" and 13" include flat rings the same diameter and offset axially on opposite sides of the core.

As can be seen in the right-hand part of FIG. 3, some of the housings (the housing 16"A in this example) can remain empty, with no magnet 14" therein.

The longitudinal projections of the polepieces adapted to extend along the airgaps can be provided, not by their edges as in FIG. 1, but by ribs 12"C and 13"C on opposite sides of the core 11".

The circumferential dimensions of the magnets (parallel to the line L") define an arc α typically subtending an angle in the order of 1° to 15°, for example between approximately 3° and 10° (FIG. 3).

In the FIG. 2 example the angular separation β between the centers of the magnets is 10°, whereas it is approximately 13° in FIG. 3 (for a total of 28 housings).

The ratio α/62 is preferably in the same range as indicated above for l/Δ.

FIGS. 5 to 13 show a variant of the bar from FIGS. 3 and 4 with forty housings 36, the distance between which varies.

The bar 30 includes a holding member 35 in the edges of which are formed grooves 38 and 39 the width a of which is approximately 65% of the width b of the holding member 35.

The dimension e of the magnets 34 (i.e. their diameter if they are cylindrical) is between a and b in this example.

The depth y of the grooves is between 0% and 15% of the height $Y_0$ of the magnets, i.e. of the distance between the bottoms of the grooves.

Polepieces 32 and 33 include longitudinal ribs 40 and 41 adapted to occupy substantially all of the width of the grooves 38 and 39 (see FIGS. 10 and 11) and which contribute to relative positioning of the polepieces and the holding member 35 and to axial retention of the magnets.

Figure 10:
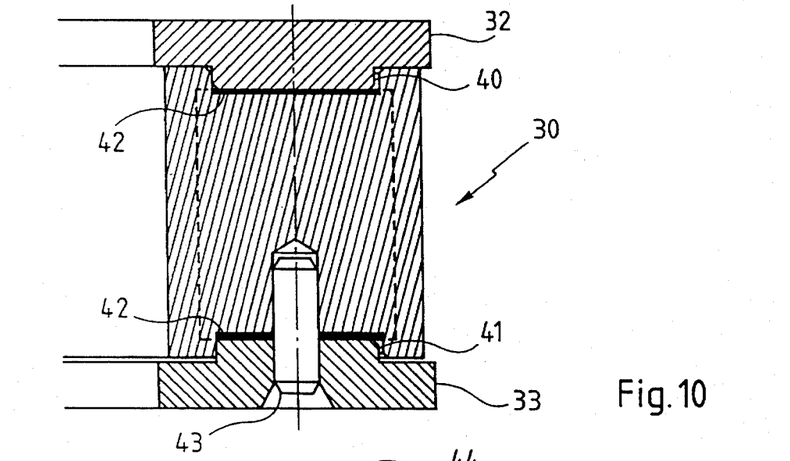
FIG. 10 is a view of the bar in section on the same plane as FIG. 7.
Figure 11:
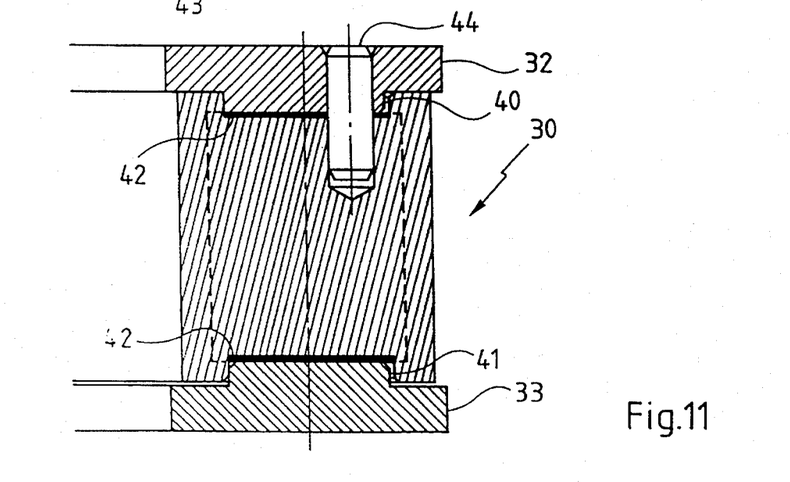
FIG. 11 is a view of this bar in section on the same plane as FIG. 8.
Figure 12:
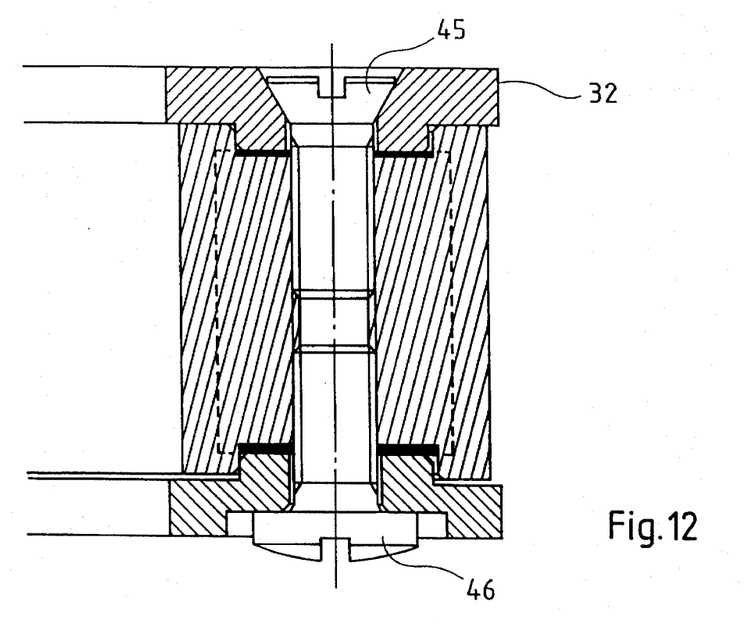
FIG. 12 is a view of the bar from FIG. 5 in section taken on the line, XII—XII.

Adhesive 42 can be applied between the bottom of the grooves and the ribs; however, it is preferable for there to be no adhesive between the magnets 34 and the housings 36 or the ribs 40 and 41.

The polepieces are preferably fixed to the holding member 35, independently of the magnets, by screws 43, 44, 45, 46 disposed circumferentially between the housings 36, some of which fix the polepiece 32 and the others of which fix the polepiece 33.

In the example shown some of the screws (the screws 43, 45 and 46, whichever polepiece they are in) are disposed midway between the edges of the polepiece concerned, whereas other screws (the screws 44) are offset, in this example towards the outside.

Figure 5:
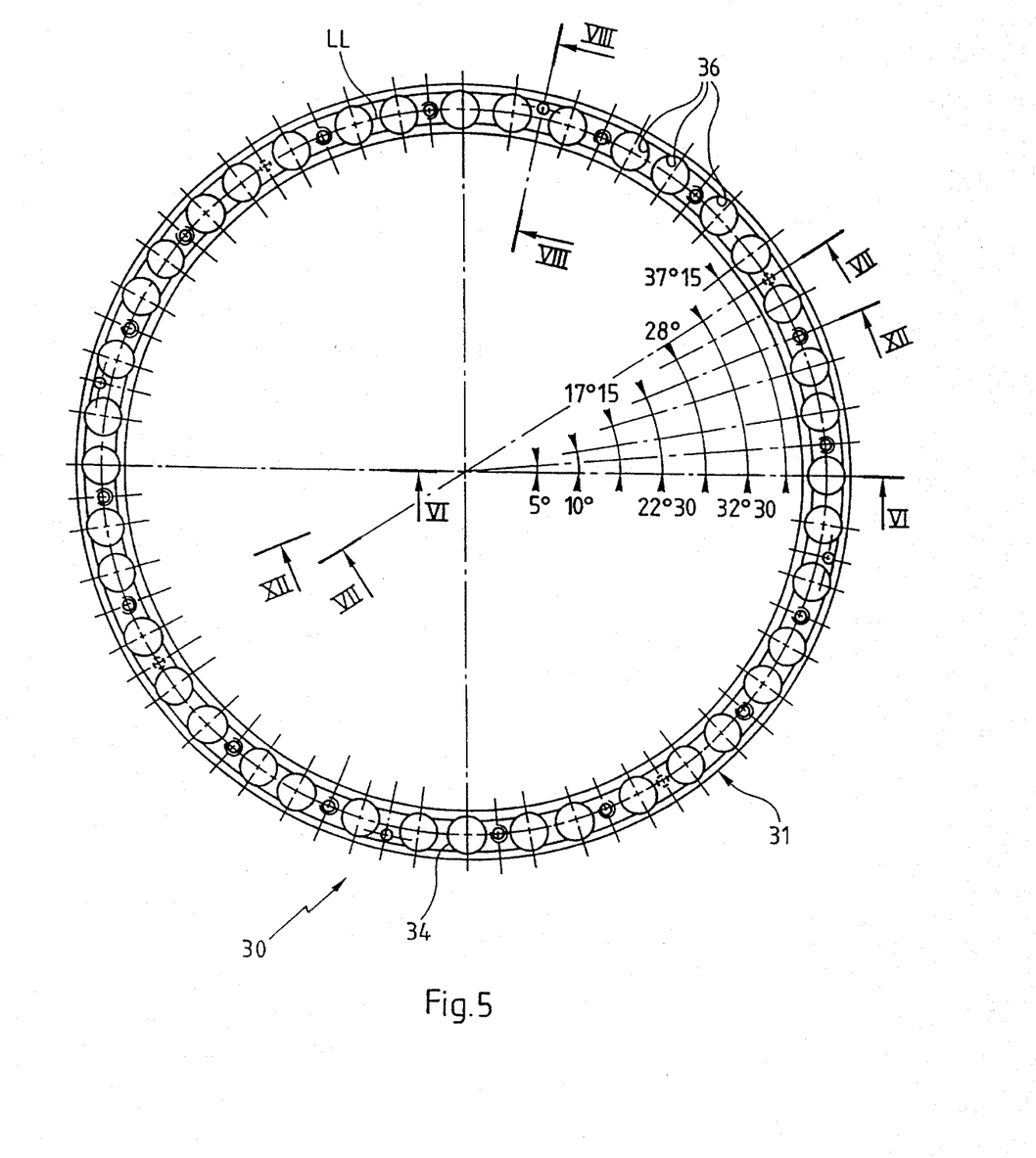
FIG. 5 is a top view of the core of another circular magnetic Bar which is magnetized axially.
Figure 6:
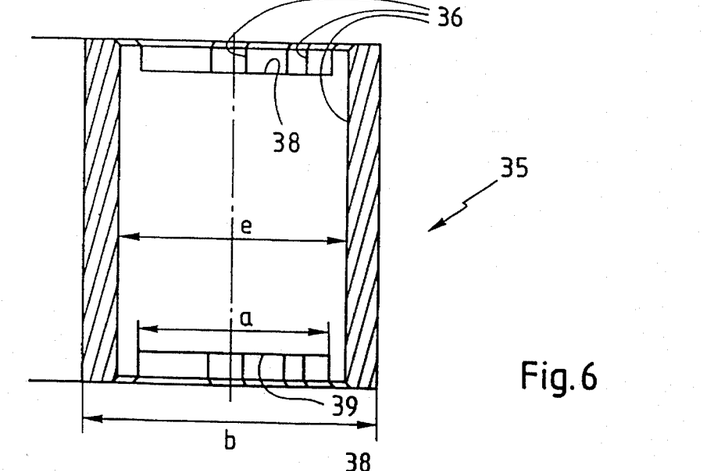
FIG. 6 is a view of the core in section taken on the line VI—VI in FIG. 5.
Figure 7:
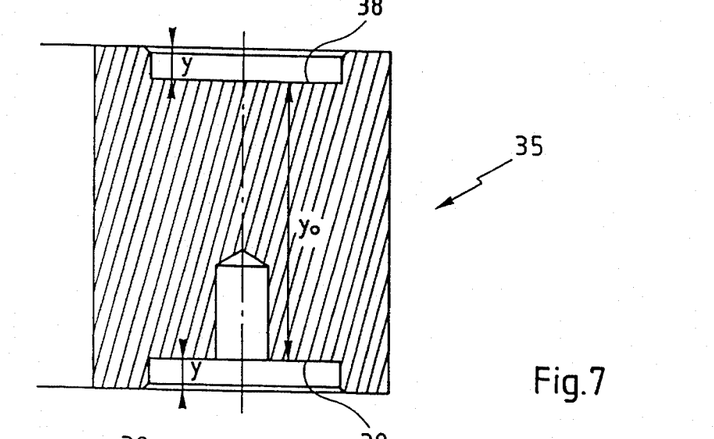
FIG. 7 is a view of the core in section taken on the line VII—VII in FIG. 5.
Figure 8:
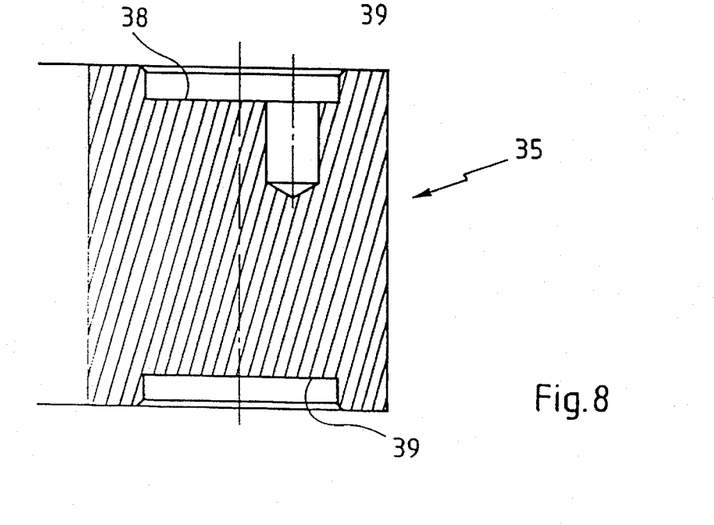
FIG. 8 is a view of the core in section taken on the line VIII—VIII in FIG. 5.
Figure 9:
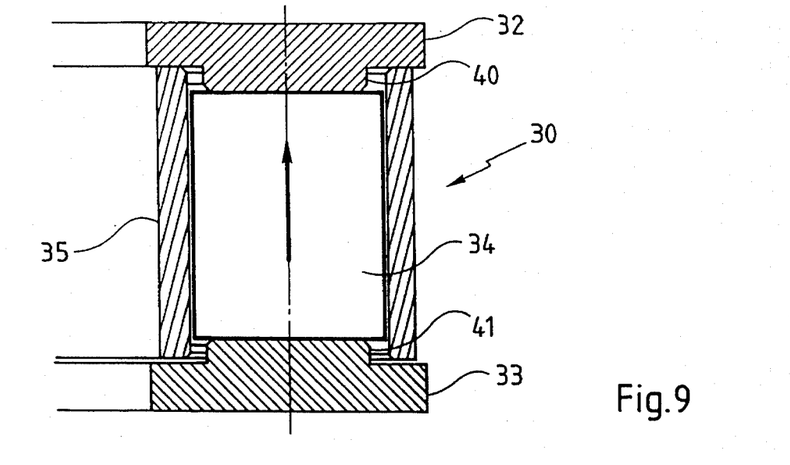
FIG. 9 is a view in section of a bar incorporating the core, a magnet and its polepieces, with the same section plane as FIG. 6.

FIG. 5 shows that the screws 43, 45, 46 are disposed after each group of two housings and that there are four screws 44: this explains the variation in the angular offset along the median line LL.

Figure 13:
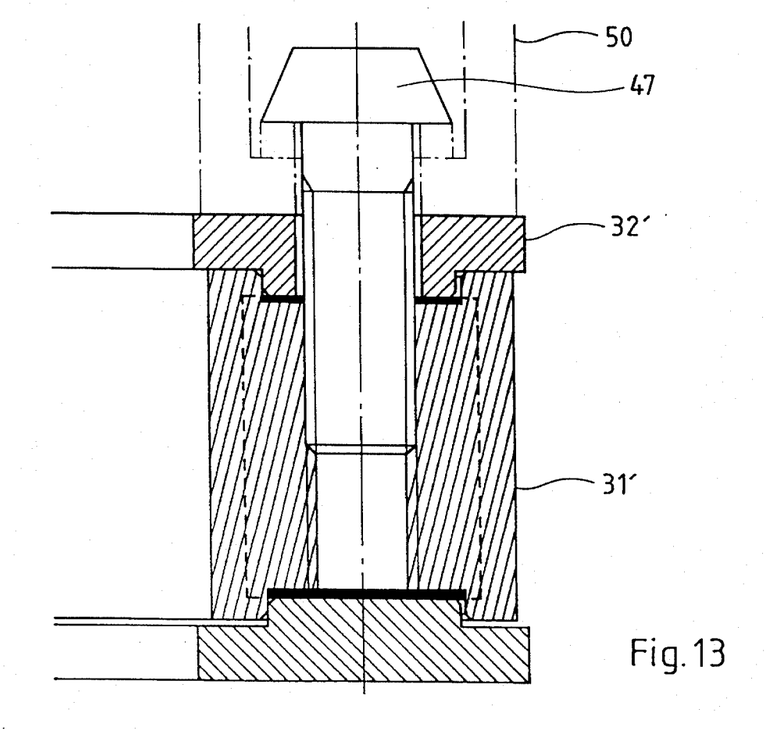
FIG. 13 is a variant of FIG. 12.

FIG. 13 shows a fixing member 47 such as a screw with a shouldered head used to fix a core 31' not only to the polepiece 32 but also to a mobile member 50.

Figure 14:
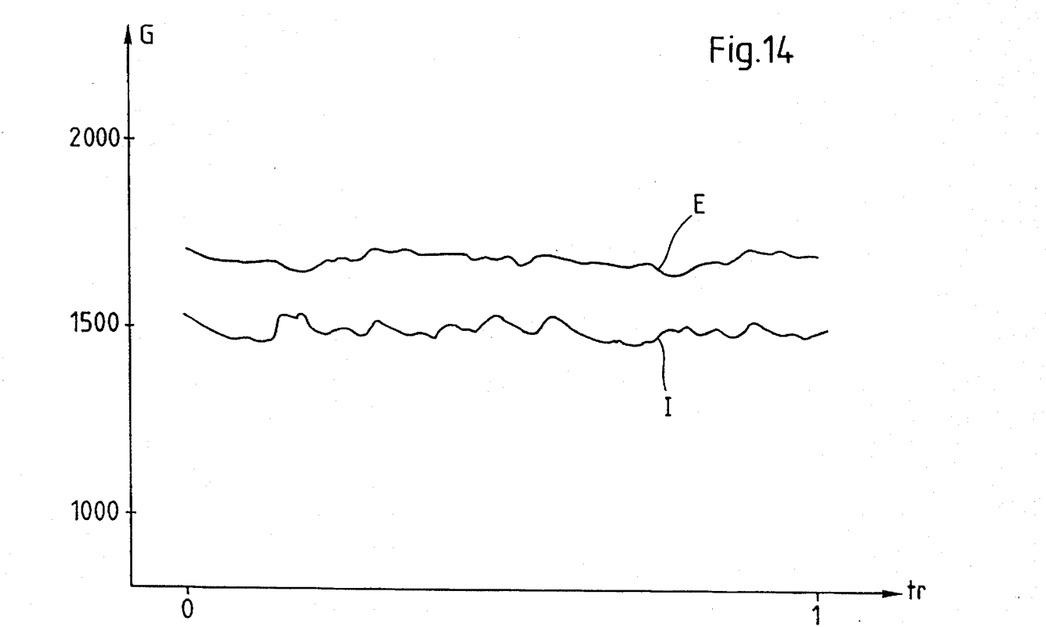
FIG. 14 is a graph showing the variation for one revolution of the magnetic flux along internal teeth (I) and external teeth (E) of a conventional magnetic bar with the same geometry as that shown in FIGS. 5 to 13.

FIG. 14 shows the variation over one revolution of the magnetic flux measured along an internal edge (curve I) and an external edge (curve E) of a polepiece of a bar having the same overall geometry as the bar 30 but with a core entirely made up of contiguous magnets.

Figure 15:
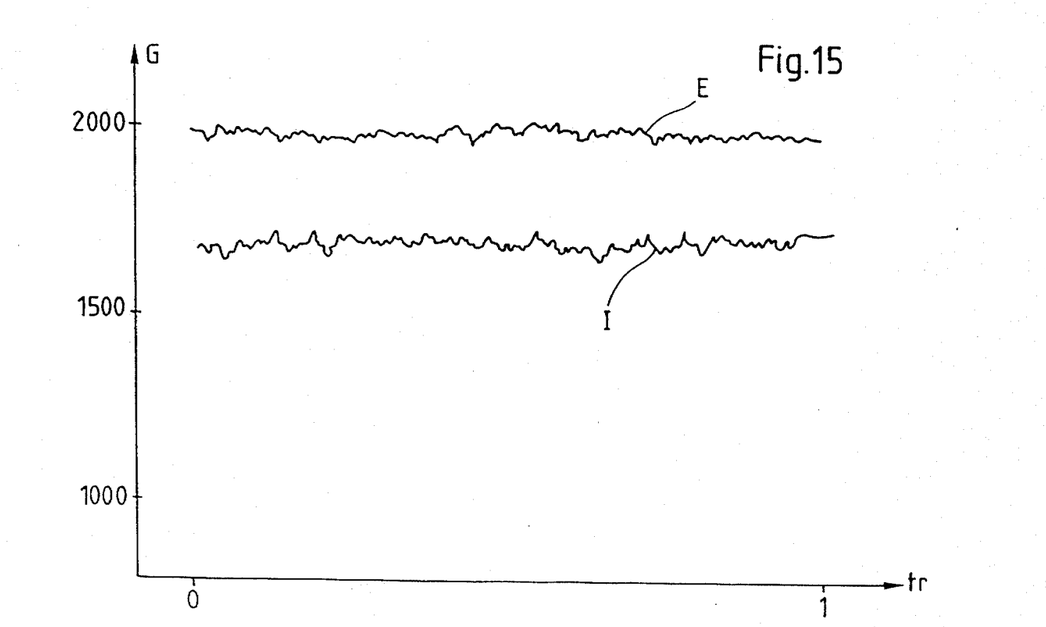
FIG. 15 is a graph showing the variation for one revolution of the magnetic flux along internal teeth (I) and external teeth (E) of the magnetic bar from FIGS. 5 to 13.

FIG. 15 shows the same variation for the bar 30.

Note that, despite the succession of discrete magnetic bars 30, the consistency of the flux is at least as good if not better than with the prior art bar from FIG. 14.

The bars have the following dimensions:

mean radius: 80 mm radial core dimension: 7 mm core height: 13 mm polepiece inside radius: 76.5 mm polepiece outside radius: 88.5 mm polepiece thickness over ribs: 3 mm.

The bar 30 additionally has the following specific features:

rib depth: 1 mm magnet height: 11 mm magnet diameter: 8.5 mm magnet material: Samarium-Cobalt holding member material: titanium polepiece material: nickel iron.

Figure 16:
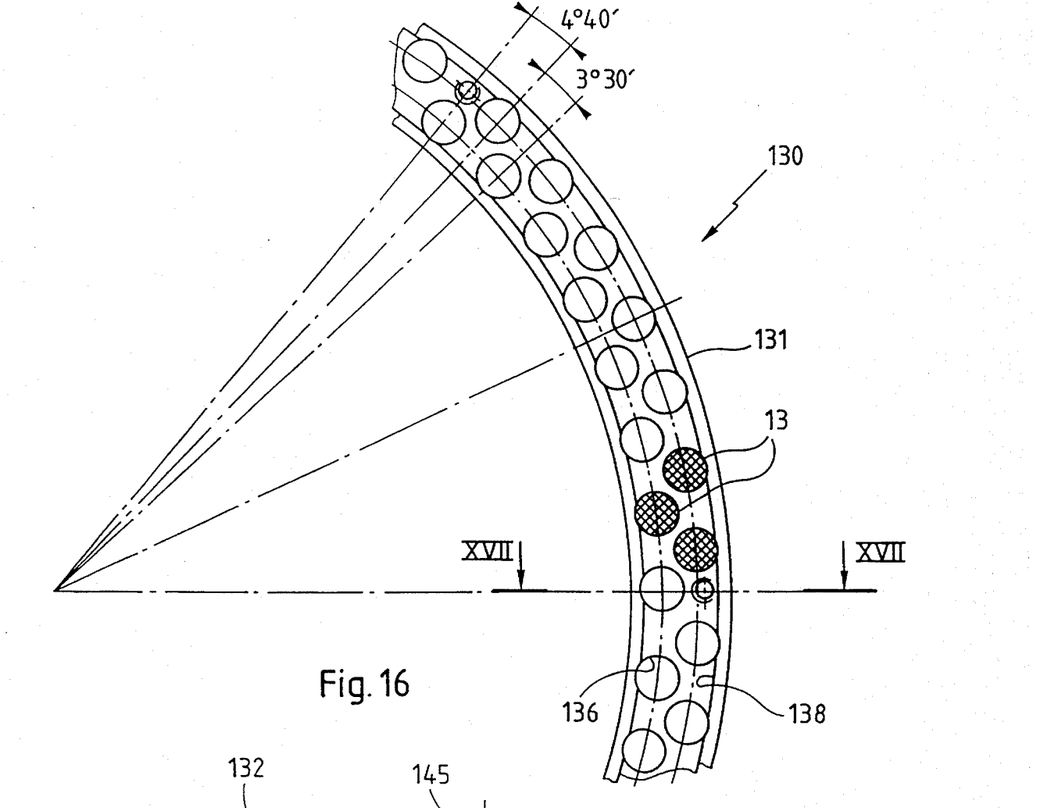
FIG. 16 is a partial top view of another circular magnetic bar which is axially magnetized without its polepieces.
Figure 17:
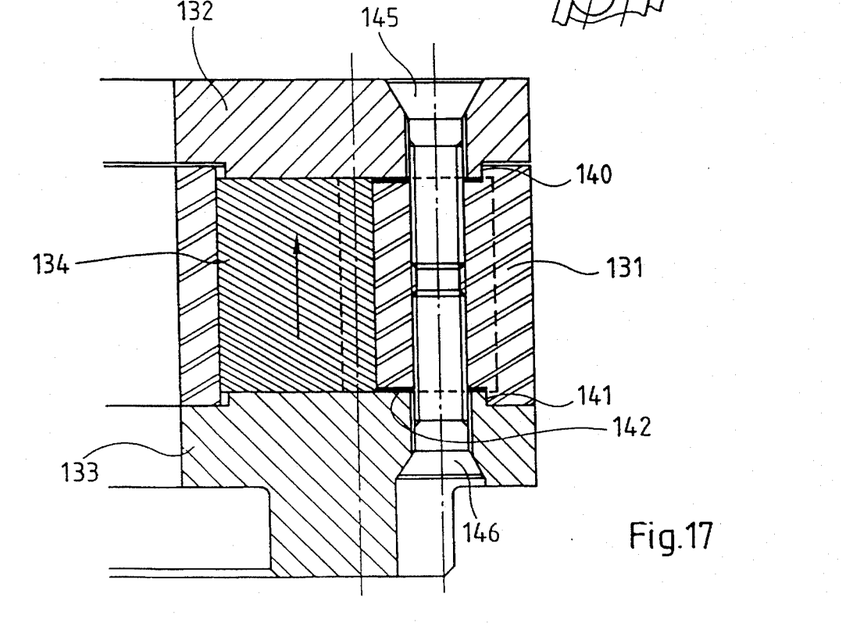
FIG. 17 is a view of the bar in section taken on the line XVII—XVII in FIG. 16.

FIGS. 16 and 17 show an embodiment with a circular shaped core and a discontinuous succession of magnets 134 which, differing in this respect from the embodiments described above, only approximately follow the median line, at least some of the magnets being disposed to one or other side of the line. To be more precise, the magnets alternate regularly between opposite sides of the line, forming an "undulating" succession of magnets.

The same reference numbers are used as in FIGS. 5 to 13 but increased by 100.

One advantage of this configuration is that magnets for a previous application can be used for a different or more demanding application.

The invention finds many applications including magnetic bearings and thrust bearings using permanently magnetized bars, as used for example in machine tool spindles, turbopump rotors, cryogenic pumps, molecular pumps, X-ray tubes, turbo-compressors, magnetic levitation systems, dampers, precision mirror bearings, inertia wheels on spacecraft and terrestrial vehicles, etc.

It goes without saying that the foregoing description has been given by way of non-limiting example only and that the person skilled in the art can put forward many variations thereon without departing from the scope of the invention. For example, other magnet shapes are feasible, including: separate tiles, rectangular parallelepipeds, tiles with rounded corners, and elliptical cylinders.

There is claimed:

1. A magnetic bar comprising:

a magnetized core defining a median line and having a direction of permanent magnetization transverse to said median line, said magnetized core including a discontinuous succession of separate magnets disposed along said median line so as to provide a gap between each adjacent pair of magnets of said separate magnets, each magnet of said separate magnets having a width in a direction parallel to said median line and a height parallel to said direction of permanent magnetization;

a first polepiece disposed along said magnetized core and transverse to said direction of permanent magnetization; and a second polepiece substantially parallel and opposite to said first polepiece so as to be disposed along said magnetized core and transverse to said direction of permanent magnetization.

2. A magnetic bar according to claim 1 wherein each magnet of said Separate magnets has a constant cross section in a direction parallel to said first polepiece and said second polepiece.

3. A magnetic bar according to claim 2 wherein said gap is between about one and about four times said width of each magnet of said separate magnets.

4. A magnetic bar according to claim 2 wherein said width of each magnet of said separate magnets is between about 50% and about 200% of said height of each magnet of said separate magnets.

5. A magnetic bar according to claim 2 wherein said width of each magnet of said separate magnets is substantially equal to a dimension transverse to said median line and parallel to said first polepiece and said second polepiece.

6. A magnetic bar according to claim 2 wherein each magnet of said separate magnets is cylindrical.

7. A magnetic bar according to claim 2 wherein said median line is a straight line.

8. A magnetic bar according to claim 2 wherein said median line is a circle.

9. A magnetic bar according to claim 8 wherein said width of each said magnet of said separate magnets defines an arc subtending an angle of between about 1 to about 15.

10. A magnetic bar according to claim 8 wherein said gap defines an arc subtending an angle of between about 0 and about 36.

11. A magnetic bar according to claim 8 wherein said gap varies along said median line.

12. A magnetic bar according to claim 8 wherein each magnet of said separate magnets is disposed axially relative to said magnetic bar.

13. A magnetic bar according to claim 8 wherein each magnet of said separate magnets is disposed radially relative to said magnetic bar.

14. A magnetic bar according to claim 1 wherein each magnet of said separate magnets is centered on said median line.

15. A magnetic bar according to claim 1 wherein at least one magnet of said separate magnets is offset from said median line.

16. A magnetic bar according to claim 1 wherein said magnetized core further includes an elongate holding member secured to said first polepiece and said second polepiece, said elongate holding member having housings in which said separate magnets fit without play.

17. A magnetic bar according to claim 16 wherein said elongate holding member is made from a nonmagnetic material.

18. A magnetic bar according to claim 16 wherein said elongate holding member includes a first groove facing said first polepiece and a second groove facing said second polepiece, said first and second grooves being parallel to said median line, each of said first and second polepieces having a locating rib extending parallel to said median line, said locating ribs being received in said first and second grooves.

19. A magnetic bar according to claim 18 wherein said height of said separate magnets is approximately equal to a distance between said first polepiece and said second polepiece.

20. A magnetic bar according to claim 18 wherein each of said locating ribs extends towards said median line a distance of between about 7% and about 15% of said height of said separate magnets.

21. A magnetic bar according to claim 18 wherein each of said locating ribs has a dimension parallel to said first polepiece and said second polepiece and transverse to said median line, said dimension being less than a corresponding dimension of said separate magnets which is parallel to said first polepiece and said second polepiece and transverse to said median line.

22. A magnetic bar according to claim 16 wherein said magnetized core is secured to said first polepiece and said second polepiece by threadably attaching said first polepiece and said second polepiece to said elongate holding member.

23. A magnetic bar according to claim 16 wherein said first polepiece and said second polepiece include, laterally, a pair of longitudinal projections adapted to border a pair of airgaps on opposite lateral sides of said first polepiece and said second polepiece.

24. A magnetic bar according to claim 16 wherein said first polepiece and said second polepiece include, opposite said separate magnets, a pair of longitudinal projections adapted to extend along a pair of airgaps defined by said first polepiece and said second polepiece.

25. A magnetic bar according to claim 16 wherein both said first polepiece and said second polepiece are made from a ferromagnetic material, and said elongate holding member is made from a nonmagnetic material.

* * * * *

UNITED STATES PATENT AND TRADEMARK OFFICE
CERTIFICATE OF CORRECTION

PATENT NO. : 5,610,568
DATED : March 11, 1997
INVENTOR(S) : Marroux

It is certified that error appears in the above-identified patent and that said Letters Patent is hereby corrected as shown below:

Title page, item [75] delete "Oliver" and insert --Olivier--

Title page, item [73] kindly delete "Societe Nationale Industrielle et Aerospatial" and insert ---- Aerospatiale Societe Nationale Industrielle ----.

Signed and Sealed this

Fifteenth Day of December, 1998

Attest:

BRUCE LEHMAN

Attesting Officer

Commissioner of Patents and Trademarks